US009481337B2

(12) United States Patent
Cowelchuk et al.

(10) Patent No.: US 9,481,337 B2
(45) Date of Patent: Nov. 1, 2016

(54) SYSTEM AND METHOD FOR MOUNTING AN AIRBAG CHUTE ASSEMBLY WITHIN A VEHICLE TRIM COMPONENT

(71) Applicant: Johnson Controls Technology Company, Holland, MI (US)

(72) Inventors: Glenn A. Cowelchuk, Holland, MI (US); Bart W. Fox, Zeeland, MI (US); Jeffrey A. Deyoung, Holland, MI (US)

( * ) Notice: Subject to any disclaimer, the term of this patent is extended or adjusted under 35 U.S.C. 154(b) by 0 days.

(21) Appl. No.: 14/424,671

(22) PCT Filed: Aug. 27, 2013

(86) PCT No.: PCT/US2013/056751
§ 371 (c)(1),
(2) Date: Feb. 27, 2015

(87) PCT Pub. No.: WO2014/035939
PCT Pub. Date: Mar. 6, 2014

(65) Prior Publication Data
US 2015/0217712 A1 Aug. 6, 2015

Related U.S. Application Data

(60) Provisional application No. 61/693,634, filed on Aug. 27, 2012.

(51) Int. Cl.
*B60R 21/215* (2011.01)
*B29C 45/14* (2006.01)
*B60R 21/217* (2011.01)
*B29L 31/30* (2006.01)

(52) U.S. Cl.
CPC ....... *B60R 21/215* (2013.01); *B29C 45/14336* (2013.01); *B29C 45/14786* (2013.01); *B29L 2031/3038* (2013.01); *B60R 2021/2172* (2013.01)

(58) Field of Classification Search
CPC .............. B60R 21/215; B60R 2021/2171; B60R 2021/2172; B29C 45/14336; B29L 2031/3038
See application file for complete search history.

(56) References Cited

U.S. PATENT DOCUMENTS

| 6,079,733 | A |  | 6/2000 | Towler |
| 7,014,208 | B2 | * | 3/2006 | DePue ................ B29C 45/1676 280/728.3 |
| 8,474,861 | B1 | * | 7/2013 | Twork ......................... 280/728.3 |
| 9,010,800 | B1 | * | 4/2015 | Hunter ........................ 280/728.3 |
| 2002/0042235 | A1 |  | 4/2002 | Ueno et al. |
| 2005/0121818 | A1 | * | 6/2005 | Cowelchuk et al. ......... 264/138 |

FOREIGN PATENT DOCUMENTS

| EP | 0748722 | 12/1996 |
| EP | 1410958 | 4/2004 |
| EP | 2006166 | 12/2008 |

OTHER PUBLICATIONS

PCT International Search Report and Written Opinion dated Nov. 15, 2013.

* cited by examiner

*Primary Examiner* — Faye M Fleming

(57) ABSTRACT

A method of manufacturing a vehicle trim component includes disposing a fiber panel within a mold cavity, and aligning an airbag chute assembly with the fiber panel. The method also includes compressing the fiber panel within the mold cavity to form the fiber panel into a desired shape. At least a portion of the fiber panel is compressed between a surface of the mold cavity and a surface of the airbag chute assembly.

17 Claims, 10 Drawing Sheets

SYSTEM AND METHOD FOR MOUNTING AN AIRBAG CHUTE ASSEMBLY WITHIN A VEHICLE TRIM COMPONENT

CROSS REFERENCE TO RELATED APPLICATION

This application is a national stage of PCT Application No. PCT/US2013/56751, entitled "SYSTEM AND METHOD FOR MOUNTING AN AIRBAG CHUTE ASSEMBLY WITHIN A VEHICLE TRIM COMPONENT", filed on Aug. 27, 2013, which claims priority from and the benefit of U.S. Provisional Patent Application Ser. No. 61/693,634, entitled "SYSTEM AND METHOD FOR MOUNTING AN AIRBAG CHUTE ASSEMBLY WITHIN A VEHICLE TRIM COMPONENT", filed Aug. 27, 2012. Each of the foregoing applications is hereby incorporated by reference in its entirety.

BACKGROUND

The invention relates generally to a system and method for mounting an airbag chute assembly within a vehicle trim component.

Airbags may be positioned throughout a vehicle interior to substantially reduce the possibility of passenger contact with an interior surface during a high g-force event (e.g., rapid acceleration/deceleration associated with a vehicle impact). For example, an airbag may be positioned behind a portion of the instrument panel adjacent to a front passenger. During a high g-force event, the airbag deploys, thereby reducing the possibility of contact between the front passenger and the instrument panel.

Typical instrument panels include an airbag chute assembly positioned behind a show surface, and configured to house an airbag module. In certain instrument panel configurations, the airbag chute assembly is vibration welded, or otherwise coupled, to the surrounding instrument panel support structure. Unfortunately, the process of coupling (e.g., via vibration welding) the airbag chute assembly to the instrument panel support structure is time consuming and labor intensive, thereby increasing the cost and duration of the instrument panel manufacturing process.

In addition, certain instrument panels include an integral airbag door configured to facilitate deployment of the airbag through the instrument panel. Such airbag doors generally include a ridge or weakened seam that enables portions of the door to separate from one another during airbag deployment. The ridge is typically formed by machining a groove into a rear surface of the instrument panel. Unfortunately, the process of machining the groove is time consuming and labor intensive, thereby further increasing the cost and duration of the instrument panel manufacturing process.

BRIEF DESCRIPTION OF THE INVENTION

The present invention relates to a method of manufacturing a vehicle trim component including disposing a fiber panel within a mold cavity, and aligning an airbag chute assembly with the fiber panel. The method also includes compressing the fiber panel within the mold cavity to form the fiber panel into a desired shape. At least a portion of the fiber panel is compressed between a surface of the mold cavity and a surface of the airbag chute assembly.

The present invention also relates to a vehicle trim component prepared by a process including disposing a fiber panel within a mold cavity, and aligning an airbag chute assembly with the fiber panel. The method also includes compressing the fiber panel within the mold cavity to form the fiber panel into a desired shape. At least a portion of the fiber panel is compressed between a surface of the mold cavity and a surface of the airbag chute assembly.

The present invention further relates to a vehicle trim component including an airbag chute assembly, and a fiber panel in contact with the airbag chute assembly. At least a portion of the fiber panel is compression-formed against the airbag chute assembly to establish a substantially smooth outer surface of the vehicle trim component.

The present invention relates to a method of manufacturing a vehicle trim component including disposing an airbag chute assembly within a mold cavity, and injecting resin into the mold cavity to form a support structure around the airbag chute assembly. The mold cavity is configured to form the support structure in substantial alignment with the airbag chute assembly to establish a substantially smooth outer surface of the vehicle trim component.

The present invention also relates to a vehicle trim component including a substrate having an opening. The vehicle trim component also includes an airbag chute assembly having a door, a chute coupled to the door and extending through the opening, and a flange extending outwardly from the chute and overlapping a portion of the substrate. The flange is secured to an outer surface of the substrate, and the flange is configured to separate from the outer surface upon contact between an airbag and the door to facilitate movement of the airbag chute assembly relative to the substrate.

The present invention further relates to a vehicle trim component including a fiber panel having a recess formed within a rear surface of the fiber panel. The vehicle trim component also includes a resin mounting structure injection molded onto the rear surface of the fiber panel. The resin mounting structure is configured to support an airbag module, and the recess is configured to facilitate deployment of an airbag from the airbag module.

The present invention relates to a method of manufacturing a vehicle trim component including disposing a fiber panel within a mold cavity. The method also includes compressing the fiber panel within the mold cavity to form the fiber panel into a desired shape and to form a recess within a rear surface of the fiber panel. In addition, the method includes injecting resin into the mold cavity to form a mounting structure on the rear surface of the fiber panel. The mounting structure is configured to support an airbag module, and the recess is configured to facilitate deployment of an airbag from the airbag module.

DRAWINGS

DETAILED DESCRIPTION

Figure 1:
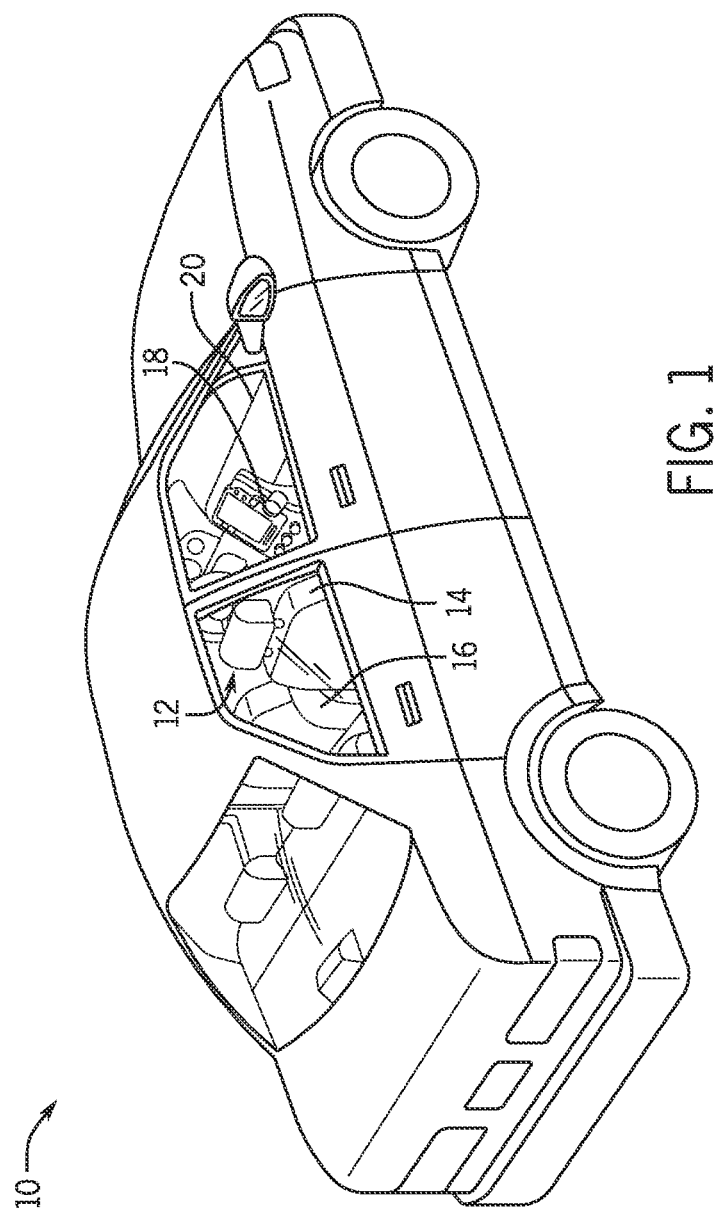
FIG. 1 is a perspective view of an exemplary vehicle that may include a trim component having an airbag chute assembly.

FIG. 1 is a perspective view of an exemplary vehicle 10 that may include a trim component having an airbag chute assembly. As illustrated, the vehicle 10 includes an interior 12 having a seat 14, an armrest 16, a center console 18, and an instrument panel 20. As discussed in detail below, certain trim components of the seat 14, the armrest 16, the center console 18, the instrument panel 20, and/or other areas within the interior 12 (e.g., an a-pillar, a b-pillar, a rear seat, etc.) may include a fiber panel compression-formed against an airbag chute assembly. For example, in certain embodiments, a vehicle trim component is prepared by a process including disposing a fiber panel within a mold cavity, and aligning an airbag chute assembly with the fiber panel. The fiber panel is then compressed within the mold cavity to form the fiber panel into a desired shape. At least a portion of the fiber panel is compressed between a surface of the mold cavity and a surface of the airbag chute assembly. Because the fiber panel is compression-formed against the airbag chute assembly, the airbag chute assembly and the fiber panel may remain secured to one another throughout the remainder of the trim component manufacturing process. As a result, the process of separately coupling the airbag chute assembly to the surrounding structure of the trim component (e.g., via vibration welding) may be obviated, thereby reducing the duration and costs associated with manufacturing a vehicle trim component.

In certain embodiments, the airbag chute assembly may include a door (e.g., formed integrally with the chute) configured to facilitate deployment of an airbag. For example, a recess may be formed within a rear surface of the door to enable portions of the door to separate from one another during airbag deployment. Alternatively, the airbag chute assembly may include a door coupled to the chute by at least one weakened connection. The weakened connection is configured to facilitate separation of a portion of the door from the chute during airbag deployment. Because the airbag chute assembly includes a door, the process of forming a door within an element of the vehicle interior (e.g., machining a groove within a rear surface of the instrument panel) is obviated. As a result, the duration and costs associated with manufacturing the vehicle trim component may be further reduced.

Figure 2:
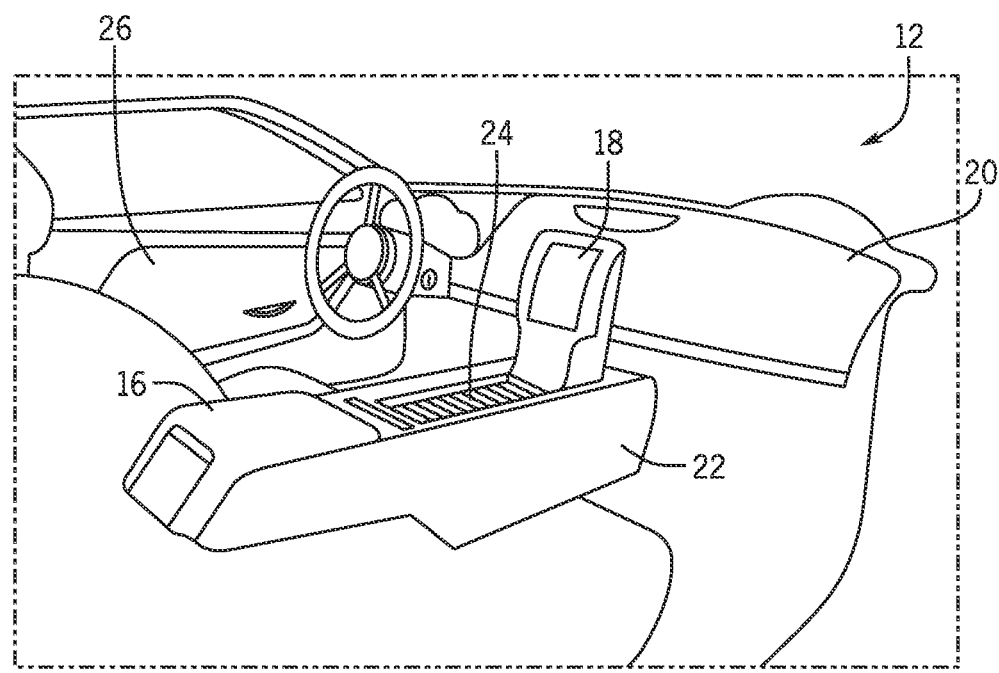
FIG. 2 is a perspective view of a part of the interior of the vehicle of FIG. 1.

FIG. 2 is a perspective view of a part of the interior of the vehicle of FIG. 1. In the illustrated embodiment, the vehicle interior 12 includes an instrument panel 20 having an fiber panel and an airbag chute assembly. As discussed in detail below, compression forming the fiber panel against the airbag chute assembly forms a trim component having a substantially smooth outer surface. Accordingly, when a cover stock (e.g., a compression laminated skin, an in mold grain laminated skin, a grained thermoplastic polyolefin skin with foam backing, etc.) is disposed onto the outer surface of the trim component, the show surface of the instrument panel 20 may appear substantially smooth, as illustrated. The smooth show surface may enhance the appearance of the vehicle interior, as compared to instrument panels having visible seams (e.g., at the interface between the airbag door and the surrounding structure of the instrument panel). While the compression forming process is described below with reference to an instrument panel 20, it should be appreciated that the compression forming process may be utilized for other interior components of the vehicle 10. For example, the illustrated interior 12 includes a floor console 22 having a tambour door 24. In certain embodiments, the floor console 22 may include a fiber panel compression-formed against an airbag chute assembly. In addition, the illustrated interior 12 includes a door panel 26 that may also include a fiber panel compression-formed against an airbag chute assembly.

Figure 3:
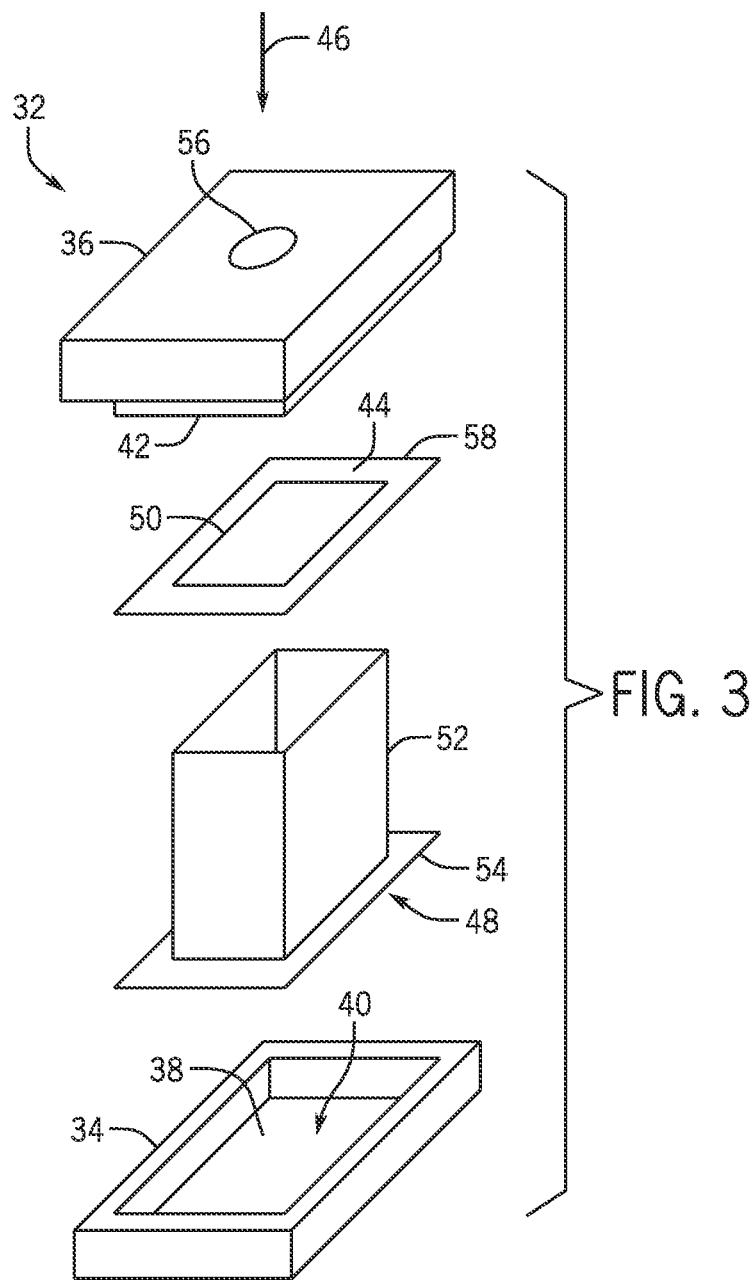
FIG. 3 is a perspective view of an embodiment of a mold assembly configured to produce a trim component by compression forming a fiber panel against an airbag chute assembly.

FIG. 3 is a perspective view of an embodiment of a mold assembly 32 configured to produce a trim component by compression forming a fiber panel against an airbag chute assembly. In the illustrated embodiment, the mold assembly 32 includes a first (e.g., lower) mold element 34, and a second (e.g., upper) mold element 36. As illustrated, the first mold element 34 includes a first surface 38 defining a first portion of a mold cavity 40, and the second mold element 36 includes a second surface 42 defining a second portion of the mold cavity 40. As discussed in detail below, the first surface 38 is configured to receive a fiber panel 44, and the second surface 42 is configured to compress the fiber panel 44 against the first surface 38 to form the fiber panel 44 into a desired shape.

In certain embodiments, the fiber panel 44 includes a combination of structural fibers and thermoplastic resin. The structural fibers may include natural fibers, such as hemp, wood, flax, kenaf and sisal, and/or synthetic fibers, such as glass fibers, carbon fibers and polymeric fibers. In addition, the thermoplastic resin may include polypropylene (PP), acrylonitrile butadiene styrene (ABS) and/or polycarbonate (PC) binders, for example. By way of example, the fiber panel 44 may be constructed from about 50 percent natural fibers and about 50 percent PP. In certain embodiments, the fiber panel 44 may be constructed from EcoCor, which is manufactured by Johnson Controls Technology Company of Holland, Mich. To facilitate compression forming, the fiber panel 44 is heated (e.g., to about 200 degrees Celsius) to induce the thermoplastic resin to soften. The fiber panel 44 is then disposed onto the first surface 38 of the cavity 40, and compressed between the first surface 38 and the second surface 42 as the second mold element 36 is driven toward the first mold element 34 along the direction 46. As the fiber panel 44 cools within the mold assembly 32, the thermoplastic solidifies, thereby establishing a substantially rigid composite panel that conforms to the shape of the mold cavity 40.

In the illustrated embodiment, at least a portion of the fiber panel 44 is compressed between a surface of the mold cavity 40 and an airbag chute assembly 48. As discussed in detail below, compression forming the fiber panel 44 against the airbag chute assembly 48 secures the airbag chute assembly to the fiber panel throughout the remainder of the trim component manufacturing process. As a result, the process of separately coupling the airbag chute assembly to the surrounding structure of the trim component (e.g., via vibration welding) is obviated. As illustrated, the fiber panel 44 includes an opening 50 configured to receive a chute 52 of the airbag chute assembly 48. For example, prior to compression forming the fiber panel 44, the airbag chute assembly 48 may be aligned with the fiber panel 44 (e.g., the chute 52 may be aligned with the opening 50). As the fiber panel 44 is compressed within the mold cavity 40, a portion of the fiber panel 44 is compressed against a flange 54 of the airbag chute assembly 48. As a result, a substantially smooth outer surface of the trim component (e.g., including an outer surface of the fiber panel and an outer surface of the flange) may be formed.

In certain embodiments, after the fiber panel 44 is compression-formed against the airbag chute assembly 48, resin is injected into the mold cavity (e.g., via the port 56) to fill a void between the first surface 38 and the second surface 42 adjacent to the fiber panel 44. For example, in certain embodiments, the void extends about a periphery 58 of the fiber panel 44. In such embodiments, the injected resin fills the void, and establishes a border about the fiber panel 44 as the resin hardens and/or cures. Due to the dimensional accuracy of the mold cavity, each edge of the resultant trim component substantially corresponds to the desired dimensions. As a result, the process of trimming the edges of the component after formation may be obviated, thereby decreasing the duration of the manufacturing process, and reducing the quantity of offal that may otherwise be deposited in a landfill.

In addition, resin may be injected into the mold cavity (e.g., via the port 56) to form support members on the rear surface of the fiber panel 44. As discussed in detail below, the support members may include ribs configured to enhance the structural rigidity of the fiber panel. In certain embodiments, the ribs may extend outwardly from the airbag chute assembly, and/or around the airbag chute assembly.

Figure 4:
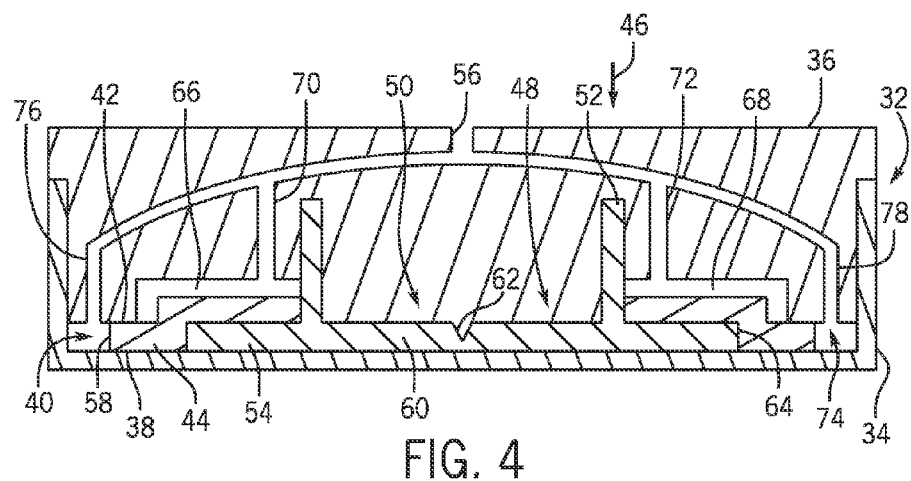
FIG. 4 is a cross-sectional view of an embodiment of a mold assembly in a closed position.

FIG. 4 is a cross-sectional view of an embodiment of a mold assembly 32 in a closed position. In the illustrated embodiment, the airbag chute assembly 48 includes a door 60, and a recess 62 formed within a rear surface of the door 60 to facilitate airbag deployment. As illustrated, the door 60 and the flange 54 are disposed against the first surface 38 of the mold cavity 40. The fiber panel 44 is disposed around the airbag chute assembly 48 such that the chute 52 extends through the opening 50, and the flange 54 overlaps a portion of the fiber panel 44. Accordingly, a first portion of the fiber panel 44 is in contact with the first surface 38 of the mold cavity 40, and a second portion of the fiber panel 44 is in contact with the flange 54 of the airbag chute assembly 48.

In this configuration, when the second mold element 36 is driven in the direction 46, the first portion of the fiber panel 44 is compressed between the first surface 38 and the second surface 42 of the mold cavity 40. In addition, the second portion of the fiber panel 44 is compressed between the second surface 42 of the mold cavity 40 and the flange 54 of the airbag chute assembly 48. Because a portion of the fiber panel 44 is compression-formed against the airbag chute assembly 48, the airbag chute assembly 48 and the fiber panel 44 may remain secured to one another throughout the remainder of the trim component manufacturing process. As a result, the process of separately coupling the airbag chute assembly to the surrounding structure of the trim component (e.g., via vibration welding) may be obviated, thereby reducing the duration and costs associated with manufacturing a vehicle trim component.

In addition, compression forming the fiber panel 44 against the airbag chute assembly 48 forms a trim component having a substantially smooth outer surface. For example, in the illustrated embodiment, an outer edge 64 of the flange 54 is substantially perpendicular to the fiber panel 44. Accordingly, when the fiber panel 44 is compression-formed against the flange, the resulting trim component includes a substantially smooth transition between the flange 54 and the fiber panel 44. For example, a gap between the flange 54 and the fiber panel 44 along the outer surface may be less than about 1.5 mm, less than about 1.25 mm, or less than about 1.0 mm. In addition, the recess 62, which is configured to facilitate deployment of the airbag, is formed within a rear surface of the door 60, thereby establishing a substantially smooth outer surface of the airbag chute assembly 48. Consequently, when a cover stock (e.g., a compression laminated skin, an in mold grain laminated skin, a grained thermoplastic polyolefin skin with foam backing, etc.) is disposed onto the outer surface of the trim component, the show surface of the instrument panel may appear substantially smooth, thereby enhancing the appearance of the vehicle interior.

In the illustrated embodiment, the mold cavity 40 includes a first void 66 positioned between the fiber panel 44 and the second surface 42 of the mold cavity 40. In addition, the mold cavity 40 includes a second void 68 positioned between the fiber panel 44 and the second surface 42 of the mold cavity 40. The first and second voids 66 and 68 are configured to form ancillary components of the vehicle trim component, such as support ribs or connectors, for example. As illustrated, a first fluid pathway 70 extends between the port 56 and the first void 66, and a second fluid pathway 72 extends between the port 56 and the second void 68. In this configuration, when liquid resin is injected into the port 56, the resin flows into the voids 66 and 68, thereby establishing the ancillary components on the rear surface of the fiber panel 44 as the resin cures and/or hardens.

In the illustrated embodiment, the mold cavity 40 includes a third void 74 extending about the periphery 58 of the fiber panel 44. Resin may be injected into the void 74 to establish a border about the fiber panel 44 as the resin hardens and/or cures. In the illustrated embodiment, the mold assembly 32 includes a third fluid pathway 76 extending between the port 56 and a first portion of the void 74, and a fourth fluid pathway 78 extending between the port 56 and a second portion of the void 74. In this configuration, when liquid resin is injected into the port 56, the resin flows into the void 74, thereby establishing a border surrounding the fiber panel 44. While the illustrated mold cavity includes voids configured to form support ribs and a resin border, it should be appreciated that certain mold cavities may include voids configured to form connectors on the rear surface of the fiber panel. Such connectors may enable the vehicle trim component to be coupled to the surrounding vehicle structure.

In operation, a fiber panel 44 is disposed within the mold cavity 40 (e.g., held within a desired position/orientation via multiple holding pins). An airbag chute assembly 48 is then aligned with the fiber panel 44. For example, the chute 52 may be aligned with the opening 50 in the fiber panel 44. The fiber panel 44 is then compressed within the mold cavity 40 to form the fiber panel into a desired shape. As previously discussed, at least a portion of the fiber panel is compressed between a surface of the mold cavity and a surface of the airbag chute assembly (e.g., the flange 54). As the fiber panel 44 solidifies within the mold cavity 40, resin is injected into the port 56, thereby filling the voids 66, 68, and 74. As the resin cures and hardens, the resin binds to the fiber panel 44, thereby forming a trim component having the desired shape, structural properties and/or ancillary components. In certain embodiments, the resin may include a thermoplastic material, such as polypropylene (PP), acrylonitrile butadiene styrene (ABS) or polycarbonate (PC), or a thermoset material, such as epoxy resin, polyimide resin, polyester resin or vinylester resin. In such embodiments, the resin is injected into the mold in a liquid state, and solidifies as the resin cures/hardens. As a result, resin parts are formed having shapes corresponding to the shapes of the respective voids within the mold cavity 40. In certain embodiments, the injected resin may be molded with a cellular structure (e.g., via a chemical or mechanical blowing agent) to reduce a mass of the trim component and/or to enhance processing properties.

Figure 5:
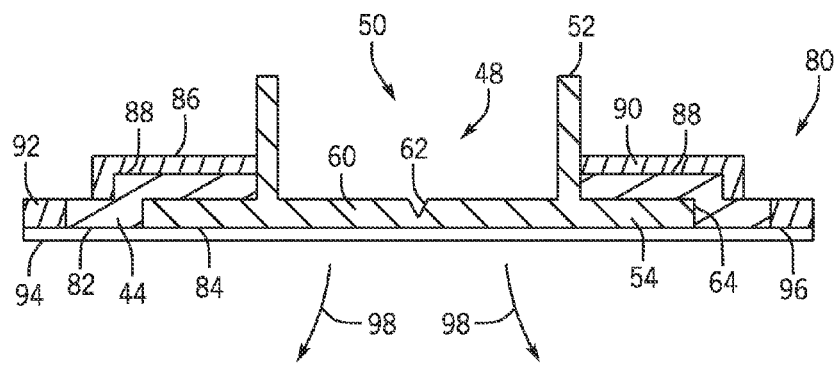
FIG. 5 is a cross-sectional view of an embodiment of a vehicle trim component manufactured by compression forming a fiber panel against an airbag chute assembly.

FIG. 5 is a cross-sectional view of an embodiment of a vehicle trim component 80 manufactured by compression forming a fiber panel against an airbag chute assembly. As illustrated, the trim component 80 includes an airbag chute assembly 48, and a fiber panel 44 in contact with the airbag chute assembly. As previously discussed, a portion of the fiber panel 44 is compression-formed against the flange 54 of the airbag chute assembly 48, thereby establishing a substantially smooth outer surface of the vehicle trim component. In the illustrated embodiment, an outer surface 82 of the fiber panel 44 is substantially aligned with an outer surface 84 of the airbag chute assembly. In addition, the outer edge 64 of the flange 54 is substantially perpendicular to the fiber panel 44, thereby establishing a substantially smooth transition between the flange 54 and the fiber panel 44. The aligned surfaces and the smooth transition between surfaces establish a smooth outer surface of the trim component 80.

While the outer edge 64 of the flange 54 is substantially perpendicular to the fiber panel 44 in the illustrated embodiment, it should be appreciated that the outer edge of the flange may be oriented at other angles in alternative embodiments. For example, in certain embodiments, the outer edge 64 may be angled toward the fiber panel 44, or angled away from the fiber panel. In further embodiments, the outer edge 64 may include multiple facets, and/or may include a curved portion. In alternative embodiments, an inner edge of the fiber panel may abut the outer edge of the flange, thereby substantially reducing or eliminating the overlap between the fiber panel and the airbag chute assembly.

In the illustrated embodiment, the vehicle trim component 80 includes a first resin support member 86 injection molded onto a rear surface 88 of the fiber panel 44, and configured to support the fiber panel. As previously discussed, the first resin support member 86 may be formed by injecting resin into the first void 66. In addition, the vehicle trim component 80 includes a second resin support member 90 injection molded onto the rear surface 88 of the fiber panel 44, and configured to support the fiber panel. The second resin support member 90 may be formed by injecting resin into the second void 68. Because the illustrated resin support members 86 and 90 extend to the chute 52, the resin support members may couple the airbag chute assembly 48 to the fiber panel 44. While the illustrated vehicle trim component 80 includes two resin support members 86 and 90, it should be appreciated that further embodiments may include additional resin support members extending outwardly from the airbag chute assembly 48. In addition, it should be appreciated that certain embodiments of the trim component may include resin support members extending around the airbag chute assembly, and/or otherwise oriented on the rear surface 88 of the fiber panel 44.

In addition, the vehicle trim component 80 includes a resin border 92 extending about a periphery 58 of the fiber panel 44. As previously discussed, the resin border 92 may be formed by injecting resin into the third void 74 of the mold cavity 40. Due to the dimensional accuracy of the third void 74 of the mold cavity 40, each edge of the resultant trim component substantially corresponds to desired dimensions. As a result, the process of trimming the edges of the component after formation may be obviated, thereby decreasing the duration of the manufacturing process, and reducing the quantity of offal that may otherwise be deposited in a landfill.

In the illustrated embodiment, a cover stock 94 is disposed onto an outer surface of the vehicle trim component to form a show surface. As illustrated, an outer surface 96 of the resin border 92, the outer surface 82 of the fiber panel 44, and the outer surface 84 of the airbag chute assembly 48 are substantially aligned with one another. Consequently, when the cover stock 94 is disposed onto the outer surfaces, the show surface of the instrument panel may appear substantially smooth, thereby enhancing the appearance of the vehicle interior.

Furthermore, in the illustrated embodiment, the door 60 includes a recess 62 formed within a rear surface of the door. The recess 62 enables portions (e.g., panels) of the door to separate from one another during airbag deployment. For example, when the airbag deploys, contact between the airbag and the door 60 induces the panels to separate from one another along the recess 62. As the airbag drives the panels in the direction 98, the panels tear an opening in the cover stock 94, thereby facilitating airbag deployment. Because the airbag chute assembly includes a door, the process of forming a door within an element of the vehicle interior (e.g., machining a groove within a rear surface of the instrument panel) is obviated. As a result, the duration and costs associated with manufacturing the vehicle trim component may be further reduced. In addition, because the recess 62 is formed on the rear surface of the door 60, the outer surface of the door 60 may be substantially smooth, thereby maintaining the smooth appearance of the vehicle trim component 80.

Figure 6:
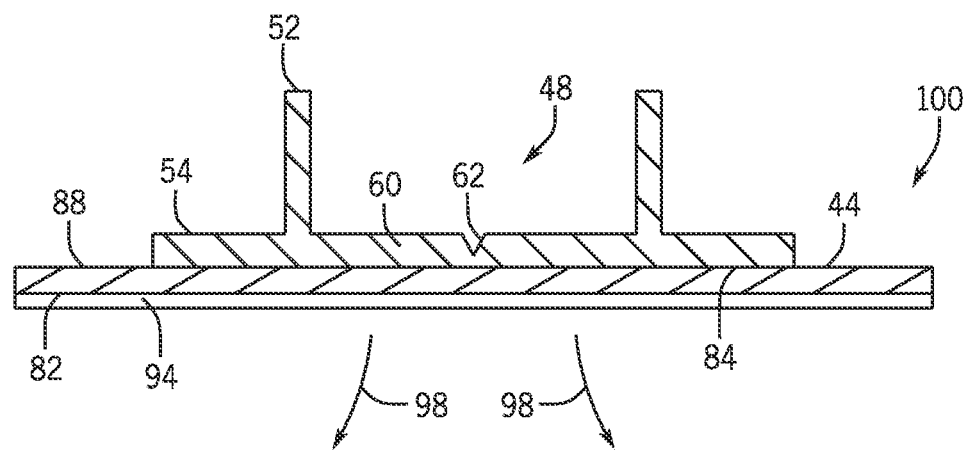
FIG. 6 is a cross-sectional view of another embodiment of a vehicle trim component manufactured by compression forming a fiber panel against an airbag chute assembly.

FIG. 6 is a cross-sectional view of another embodiment of a vehicle trim component 100 manufactured by compression forming a fiber panel against an airbag chute assembly. In the illustrated embodiment, the outer surface 84 of the airbag chute assembly 48 is in contact with the rear surface 88 of the fiber panel 44. To form the illustrated vehicle trim component 100, the fiber panel 44 is compressed between the first surface 38 of the mold cavity 40 and the outer surface 84 of the airbag chute assembly 48. Because the fiber panel 44 is compression-formed against the airbag chute assembly 48, the airbag chute assembly and the fiber panel may remain secured to one another throughout the remainder of the trim component manufacturing process. As a result, the process of separately coupling the airbag chute assembly to the surrounding structure of the trim component (e.g., via vibration welding) may be obviated, thereby reducing the duration and costs associated with manufacturing a vehicle trim component.

In addition, because the fiber panel 44 does not include an opening for the airbag chute assembly, the outer surface of the trim component 100 may be substantially smooth. As a result, when the cover stock 94 is applied to the outer surface 82 of the fiber panel 44, the cover stock may form a smooth show surface, thereby aesthetically enhancing the vehicle trim component 100. Furthermore, the airbag door 60 may be configured to tear an opening in the fiber panel 44 and the cover stock 94 to facilitate airbag deployment. For example, when the airbag deploys, contact between the airbag and the door 60 induces the door panels to separate from one another along the recess 62. As the airbag drives the panels in the direction 98, the panels tear an opening in the fiber panel 44 and the cover stock 94, thereby facilitating airbag deployment. It should be appreciated that certain embodiments of the vehicle trim component 100 may include resin members injection molded onto the rear surface 88 of the fiber panel 44, and configured to support the fiber panel 44. In addition, certain embodiments of the vehicle trim component 100 may include a resin border extending about a periphery 58 of the fiber panel 44.

Figure 7:
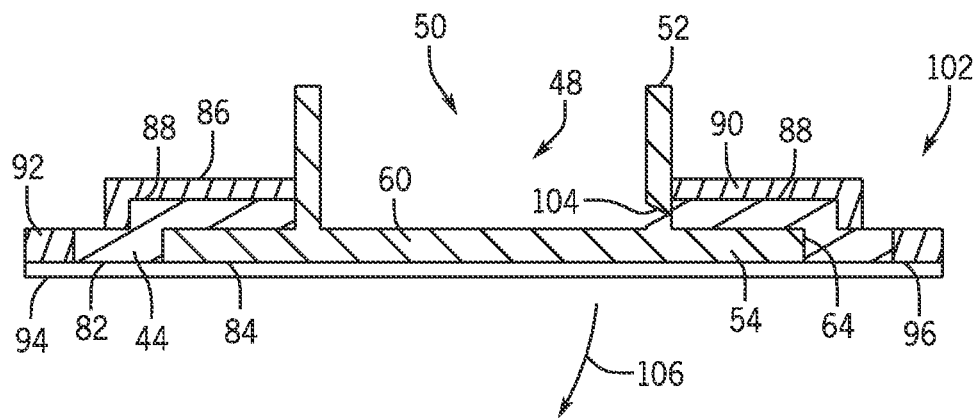
FIG. 7 is a cross-sectional view of a further embodiment of a vehicle trim component manufactured by compression forming a fiber panel against an airbag chute assembly.

FIG. 7 is a cross-sectional view of a further embodiment of a vehicle trim component 102 manufactured by compression forming a fiber panel against an airbag chute assembly. In the illustrated embodiment, the airbag chute assembly 48 includes the door 60 and the chute 52. The door 60 is coupled to the chute 52 by a weakened connection 104 to facilitate airbag deployment. For example, when the airbag deploys, contact between the airbag and the door 60 induces the door 60 to separate from the chute 52 along the weakened connection. As the airbag drives the door in the direction 106, a portion of the flange 54 adjacent to the weakened connection 104 separates from the fiber panel 44. The door 60 then tears an opening in the cover stock 94, thereby facilitating airbag deployment. Because the airbag chute assembly includes a door, the process of forming a door within an element of the vehicle interior (e.g., by machining a groove within a rear surface of the instrument panel) is obviated. As a result, the duration and costs associated with manufacturing the vehicle trim component may be further reduced. In addition, because the weakened connection 104 is formed at the interface between the door 60 and the chute 52, the outer surface of the door 60 may be substantially smooth, thereby maintaining the smooth appearance of the vehicle trim component 80.

While the illustrated embodiment includes one weakened connection 104, it should be appreciated that alternative embodiments may include additional weakened connections between the door 60 and the chute 52. For example, in certain embodiments, the chute 52 may be four-sided, and three of the sides may include weakened connections. In such embodiments, the door may remain attached to the chute by the remaining side after airbag deployment.

Figure 8:
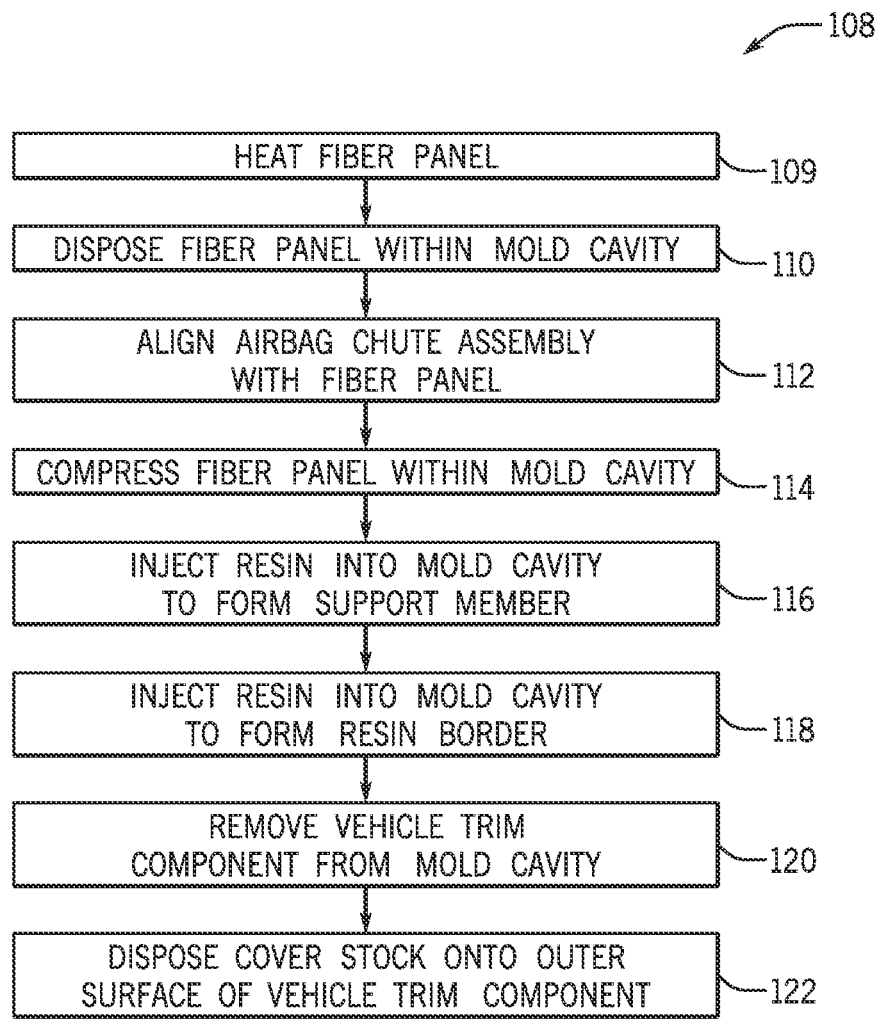
FIG. 8 is a flow diagram of an embodiment of a method of manufacturing a vehicle trim component by compression forming a fiber panel against an airbag chute assembly.

FIG. 8 is a flow diagram of an embodiment of a method 108 of manufacturing a vehicle trim component by compression forming a fiber panel against an airbag chute assembly. First, as represented by block 109, a fiber panel is heated. For example, if the fiber panel includes thermoplastic resin, heating the panel softens the resin, thereby facilitating compression forming of the panel. Next, the fiber panel is disposed within a mold cavity, as represented by block 110. An airbag chute assembly is then aligned with the fiber panel, as represented by block 112. For example, a chute of the airbag chute assembly may be aligned with an opening in the fiber panel. Alternatively, a door of the airbag chute assembly may be aligned with a desired region of the fiber panel. In alternative embodiments, the airbag chute assembly is disposed within the mold cavity prior to the fiber panel. For example, the airbag chute assembly may be disposed within the mold cavity, and the fiber panel may be aligned with the airbag chute assembly. In further embodiments, the airbag chute assembly may be aligned with the fiber panel prior to disposing both elements into the mold cavity.

Next, as represented by block 114, the fiber panel is compressed within the mold cavity. As previously discussed, at least a portion of the fiber panel is compressed between a surface of the mold cavity and a surface of the airbag chute assembly. For example, in certain embodiments, the airbag chute assembly includes a flange extending outwardly from the chute, and configured to overlap a portion of the fiber panel. As the fiber panel is compressed within the mold cavity, the portion of the fiber panel is compressed between a surface of the mold cavity and a surface of the flange. In further embodiments, the fiber panel may be compressed between a surface of the mold cavity and a surface of a door of the airbag chute assembly. Because the fiber panel is compression-formed against the airbag chute assembly, the airbag chute assembly and the fiber panel may remain secured to one another throughout the remainder of the trim component manufacturing process, thereby obviating the process of separately coupling the airbag chute assembly to the surrounding structure of the trim component (e.g., via vibration welding).

In certain embodiments, resin may be injected into the mold cavity to form support members on a rear surface of the fiber panel, as represented by block 116. As previously discussed, the support members may include ribs configured to enhance the structural rigidity of the fiber panel. For example, the ribs may extend outwardly from the airbag chute assembly, and/or around the airbag chute assembly. Next, as represented by block 118, resin is injected into the mold cavity to form a resin border extending about at least a portion of a periphery of the fiber panel. As previously discussed, due to the dimensional accuracy of the mold cavity, each edge of the resultant trim component substantially corresponds to desired dimensions. As a result, the process of trimming the edges of the component after formation may be obviated, thereby decreasing the duration of the manufacturing process, and reducing the quantity of offal that may otherwise be deposited in a landfill. In certain embodiments, a cover stock may be disposed on an outer surface of the trim component to aesthetically enhance a show surface of the component. In such embodiments, the vehicle trim component is removed from the mold cavity, as represented by block 120. Next, a cover stock is disposed onto the outer surface of the component to form the show surface, as represented by block 122.

Figure 9:
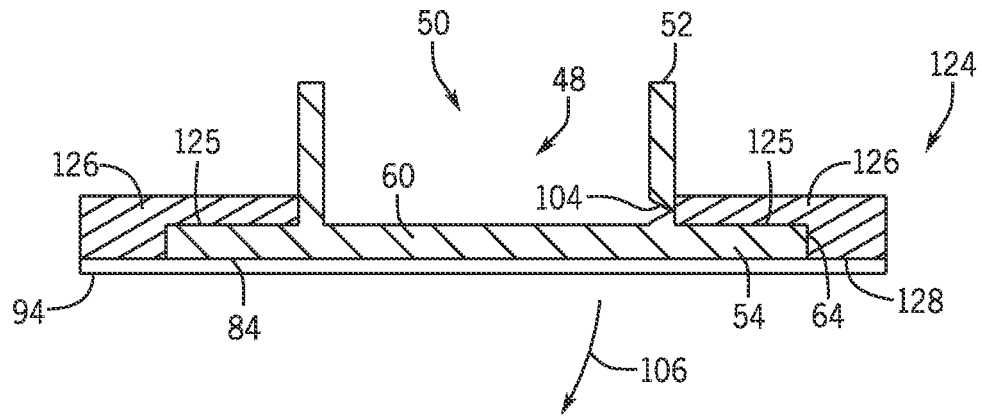
FIG. 9 is a cross-sectional view of an embodiment of a vehicle trim component manufactured by injecting resin around an airbag chute assembly to form a support structure.

FIG. 9 is a cross-sectional view of an embodiment of a vehicle trim component 124 manufactured by injecting resin around an airbag chute assembly to form a support structure. In the illustrated embodiment, resin is injected onto a rear surface 125 of the flange 54, thereby forming a support structure 126 that extends laterally outward from the chute 52. The support structure 126 may be coupled to elements of the vehicle structure to secure the trim component 124 to a desired region of the vehicle interior. Because the resin is injected directly onto the airbag chute assembly, a fiber panel, which may be employed in other embodiments, is obviated.

In the illustrated embodiment, the outer surface 84 of the airbag chute assembly 48 is substantially aligned with an outer surface 128 of the support structure 126, thereby establishing a substantially smooth transition between the flange 54 and the support structure 126. The aligned surfaces and the smooth transition between surfaces establish a smooth outer surface of the trim component 124. In the illustrated embodiment, a cover stock 94 is disposed onto the outer surface of the vehicle trim component to form a show surface. Because the outer surface of the vehicle trim component is substantially smooth, a substantially smooth show surface may be formed, thereby enhancing the appearance of the vehicle interior.

In the illustrated embodiment, the door 60 is coupled to the chute 52 by a weakened connection 104 to facilitate airbag deployment. For example, when the airbag deploys, contact between the airbag and the door 60 induces the door 60 to separate from the chute 52 along the weakened connection. As the airbag drives the door in the direction 106, a portion of the flange 54 adjacent to the weakened connection 104 separates from the support structure 126. The door 60 then tears an opening in the cover stock 94, thereby facilitating airbag deployment. In further embodiments, the airbag door 60 may include a recess 62 formed within a rear surface of the door 60 to facilitate airbag deployment.

Figure 10:
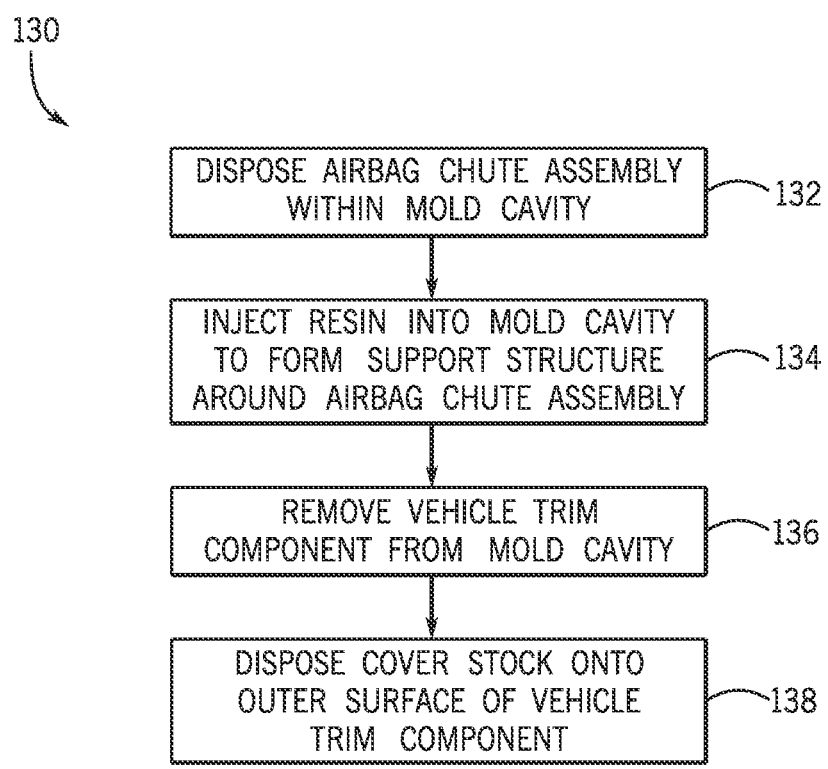
FIG. 10 is a flow diagram of an embodiment of a method of manufacturing a vehicle trim component by injecting resin around an airbag chute assembly to form a support structure.

FIG. 10 is a flow diagram of an embodiment of a method 130 of manufacturing a vehicle trim component by injecting resin around an airbag chute assembly to form a support structure. First, as represented by block 132, an airbag chute assembly is disposed within a mold cavity. Resin is then injected into the mold cavity to form a support structure around the airbag chute assembly, as represented by block 134. For example, the resin support structure may be formed by injecting resin into a void within the mold cavity. As previously discussed, the mold cavity may be configured to form the support structure in substantial alignment with the airbag chute assembly to establish a substantially smooth outer surface of the vehicle trim component. In certain embodiments, a cover stock may be disposed onto an outer surface of the trim component to aesthetically enhance a show surface of the component. In such embodiments, the vehicle trim component is removed from the mold cavity, as represented by block 136. Next, a cover stock is disposed onto the outer surface of the component to form the show surface, as represented by block 138.

Figure 11:
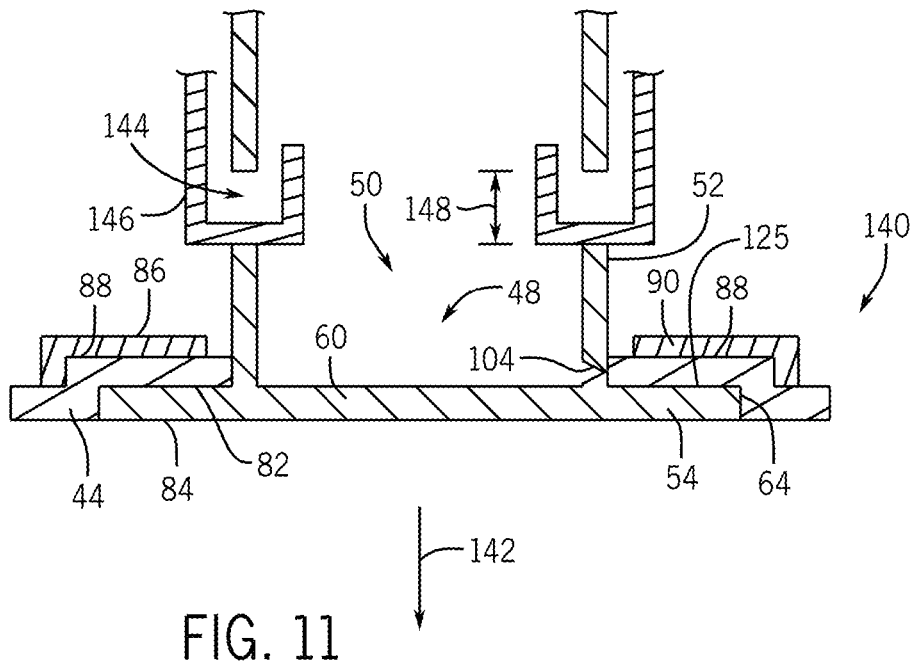
FIG. 11 is a cross-sectional view of an embodiment of a vehicle trim component having an airbag chute assembly configured to separate from a substrate upon deployment of an airbag.

FIG. 11 is a cross-sectional view of an embodiment of a vehicle trim component 140 having an airbag chute assembly configured to separate from a substrate upon deployment of an airbag. In the illustrated embodiment, the vehicle trim component includes a substrate, such as the illustrated fiber panel 44, having an opening 50. The vehicle trim component 140 also includes the airbag chute assembly 48 having a door 60, a chute 52 coupled to the door 60 and extending through the opening 50, and a flange 54 extending outwardly from the chute 52 and overlapping a portion of the fiber panel 44. Because the fiber panel 44 is compression-formed against the flange 54, the rear surface 125 of the flange 54 is secured to the outer surface 82 of the fiber panel 44. However, during airbag deployment, the flange 54 is configured to separate from the fiber panel 44, thereby facilitating movement of the airbag chute assembly 48 relative to the fiber panel 44. For example, upon contact between the airbag and the door 60, the rear surface 125 of the flange 54 separates from the outer surface 82 of the fiber panel 44, thereby facilitating movement of the airbag chute assembly 48 in a direction 142. As a result, the possibility of contact between the flange 54 and the fiber panel 44 during rotation of the door 60 is substantially reduced or eliminated.

While the substrate is formed from a fiber panel in the illustrated embodiment, it should be appreciated that, in alternative embodiments, the substrate may be formed from other materials. For example, in certain embodiments, the substrate may be formed from an injection-molded polymeric material and/or a stamped metal sheet, among other materials. In such embodiments, the flange may be secured to the substrate by fasteners, by an adhesive bond, and/or by press-fitting, among other connection systems. However, each connection system is configured to enable the flange to separate from the substrate upon contact between the airbag and the door to facilitate movement of the airbag chute assembly relative to the substrate.

In the illustrated embodiment, the chute 52 includes a window 144 configured to receive a mounting structure 146. The mounting structure 146 may be configured to support the airbag chute assembly 48 and/or the vehicle trim component 140 within the vehicle interior. The window 144 facilitates movement of the airbag chute assembly 48 relative to the mounting structure 146, thereby enabling the flange to separate from the fiber panel. A length 148 of the window 144 may be particularly selected to control movement of the airbag chute assembly 48 relative to the fiber panel 44. For example, a longer window enables the airbag chute assembly 48 to move a greater distance during airbag deployment, and a shorter window reduces the movement of the airbag chute assembly during airbag deployment. While the illustrated embodiment includes two windows 144, it should be appreciated that alternative embodiments may include more or fewer windows, such as 1, 2, 4, 6, 8, 10, 12, or more windows.

Figure 12:
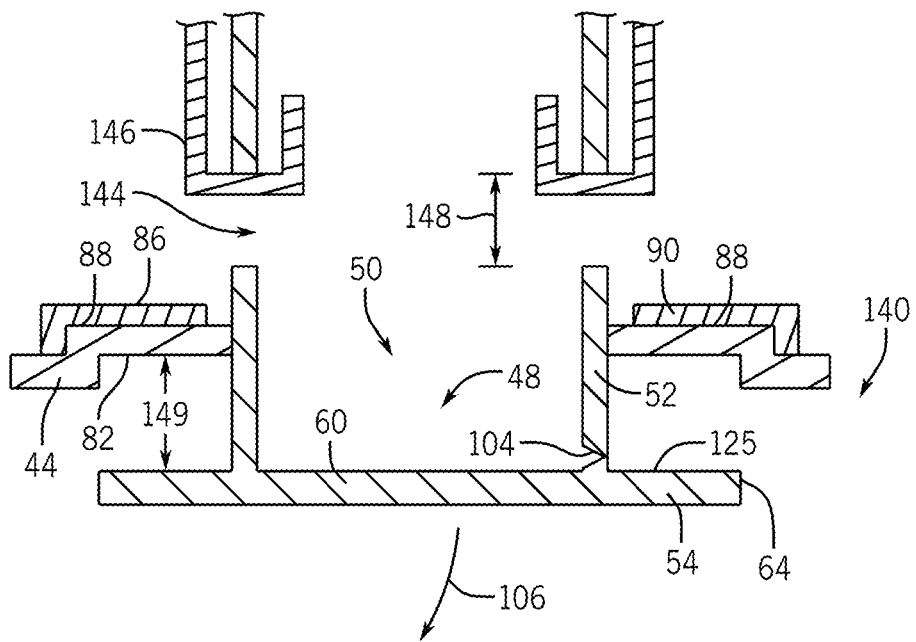
FIG. 12 is a cross-sectional view of the vehicle trim component of FIG. 11, in which the airbag chute assembly is separated from the substrate.

FIG. 12 is a cross-sectional view of the vehicle trim component 140 of FIG. 11, in which the airbag chute assembly 48 is separated from the fiber panel 44. Similar to the embodiment described above with reference to FIG. 7, the door 60 is coupled to the chute 52 by a weakened connection 104 to facilitate airbag deployment. When the airbag deploys, contact between the airbag and the door 60 induces the airbag chute assembly 48 to move in the direction 142 a distance 149, which corresponds to the length 148 of the window 144. If the vehicle trim component 140 includes a cover stock, movement of the airbag chute assembly 48 may deform, displace, and/or tear the cover stock. Upon contact between the mounting structure 146 and the chute 52, movement of the airbag chute assembly 48 in the direction 142 is blocked. As a result, continued deployment of the airbag induces the door 60 to separate from the chute 52 along the weakened connection 104, thereby facilitating rotation of the door 60 in the direction 106.

While the illustrated embodiment includes one weakened connection 104, it should be appreciated that alternative embodiments may include additional weakened connections between the door 60 and the chute 52. For example, in certain embodiments, the chute 52 may be four-sided, and three of the sides may include weakened connections. In such embodiments, the door may remain attached to the chute by the remaining side after airbag deployment.

Figure 13:
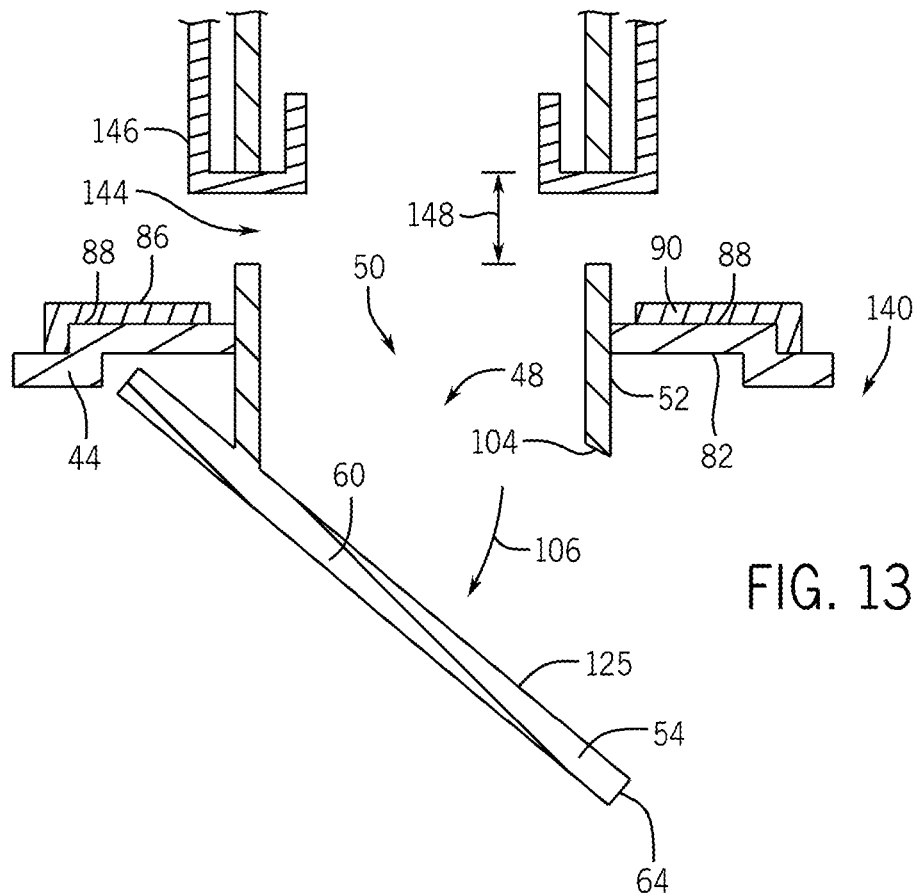
FIG. 13 is a cross-sectional view of the vehicle trim component of FIG. 11, in which a door of the airbag chute assembly is separated from a chute along a weakened connection.

FIG. 13 is a cross-sectional view of the vehicle trim component 140 of FIG. 11, in which the door 60 of the airbag chute assembly 48 is separated from the chute 52 along the weakened connection 104. As previously discussed, contact between the airbag and the door 60 induces the door to rotate in the direction 106, thereby facilitating deployment of the airbag. If the cover stock is not torn by movement of the airbag chute assembly 48 in the direction 142, rotation of the door 60 tears the cover stock, thereby enabling the airbag to fully deploy. Because the airbag chute assembly 48 moves a distance 149 in the direction 142 before the door 60 rotates in the direction 106, the possibility of contact between the flange 54 and the fiber panel 44 is substantially reduced or eliminated. As a result, airbag deployment may be enhanced and/or additional components, such as a hinge disposed between the door and the chute, may be obviated.

Figure 14:
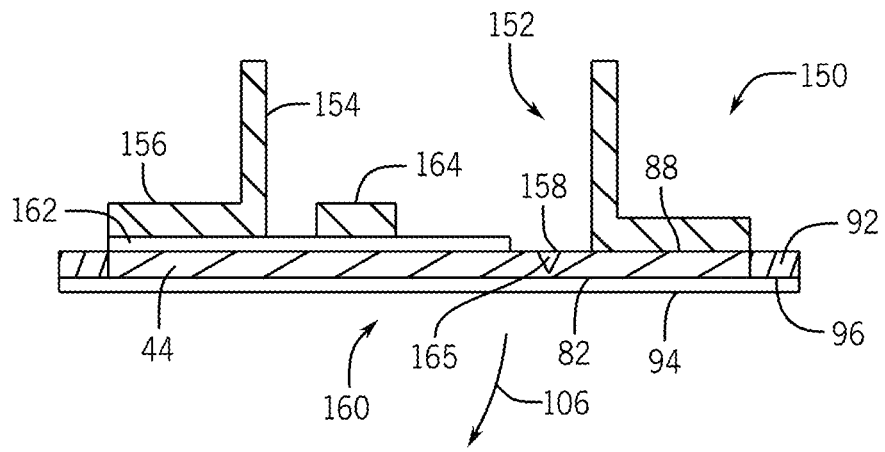
FIG. 14 is a cross-sectional view of an embodiment of a vehicle trim component manufactured by injecting resin behind a fiber panel to form a mounting structure for an airbag module.

FIG. 14 is a cross-sectional view of an embodiment of a vehicle trim component 150 manufactured by injecting resin behind a fiber panel to form a mounting structure for an airbag module. In the illustrated embodiment, the vehicle trim component 150 includes the fiber panel 44 and a resin mounting structure 152 injection molded onto the rear surface 88 of the fiber panel 44. The resin mounting structure 152 is configured to directly support an airbag module, thereby obviating the airbag chute assembly. Accordingly, the manufacturing costs and/or the complexity of the vehicle trim component may be reduced.

In the illustrated embodiment, the resin mounting structure 152 includes an airbag module support section 154 and a fiber panel support section 156. The airbag module support section 154 is configured to secure the airbag module to the vehicle trim component and to direct the airbag toward the fiber panel 44 during airbag deployment. The fiber panel support section 156 is configured to enhance the structural rigidity of the fiber panel 44. For example, the fiber panel support section 156 may include ribs or other structural members extending outwardly from the airbag module support section 154. The structural members may also form a geometric pattern (e.g., triangular, rectangular, hexagonal, etc.) along the rear surface 88 of the fiber panel 44 to enhance the structural rigidity of the vehicle trim component. In alternative embodiments, the fiber panel support section 156 may be omitted and other structural elements may be employed to support the fiber panel 44.

As illustrated, a recess 158 is formed within the rear surface 88 of the fiber panel 44 to facilitate deployment of an airbag from the airbag module. In the illustrated embodiment, the fiber panel 44 includes a door portion 160 extending between the resin mounting structure 152 and the recess 158. The door portion is configured to rotate in the direction 106 upon deployment of the airbag. For example, when the airbag deploys, contact between the airbag and the door portion 160 of the fiber panel 44 induces the door portion 160 to separate from the fiber panel 44 along the recess 158. As the airbag drives the door portion 160 in the direction 106, the airbag/door portion 160 tears an opening in the cover stock 94, thereby facilitating airbag deployment. Because the fiber panel 44 includes a door portion 160, the process of forming a door within an element of the vehicle interior (e.g., by machining a groove within a rear surface of the instrument panel) is obviated. As a result, the duration and costs associated with manufacturing the vehicle trim component may be reduced. In addition, because the recess 158 is formed on the rear surface 88 of the fiber panel 44, the outer surface 82 of the fiber panel 44 may be substantially smooth, thereby maintaining the smooth appearance of the vehicle trim component 150.

While the illustrated embodiment includes one recess 158, it should be appreciated that alternative embodiments may include additional recesses surrounding the door portion 160 of the fiber panel 44. For example, in certain embodiments, the door portion 160 may be four-sided, and three of the sides may include corresponding recesses. In such embodiments, the door portion 160 may remain attached to the fiber panel 44 by the remaining side after airbag deployment. In further embodiments, a fabric support 162 may be utilized to retain the door portion 160 during deployment of the airbag. In such embodiments, the fabric support 162 is coupled to the rear surface 88 of the fiber panel 44 by the resin mounting structure 152. For example, as the resin mounting structure 152 is being formed by an injection molding process, resin may flow through the fabric support to the rear surface 88 of the fiber panel 44, thereby securing the fabric support to the fiber panel 44. In addition, a resin feature 164 may be injection molded onto the rear surface of the door portion 160 to secure the fabric support 162 to the door portion. Similar to the resin mounting feature 152, resin may flow through the fabric support to the rear surface of the door portion as the resin feature is formed, thereby securing the fabric support to the door portion. During deployment of the airbag, the fabric support may function as a living hinge, thereby enabling the door portion to rotate in the direction 106 while securing the door portion 160 to the vehicle trim component 150. In certain embodiments, the fabric support 162 may be formed from woven and/or non-woven fibers, such as glass fibers, carbon fibers, metal fibers, ceramic fibers, and/or polymeric fibers, among others.

In the illustrated embodiment, a second resin feature 165 is injection molded within the recess 158 of the fiber panel 44. The second resin feature 165 is configured to secure the door portion 160 to the fiber panel 44 prior to deployment of the airbag. In addition, the second resin feature 165 may facilitate separation of the door portion 160 from the fiber panel 44 along the recess 158. In certain embodiments, the second resin feature 165 may be formed from a ductile material that enhances the separation, thereby facilitating airbag deployment. In further embodiments, the second resin feature 165 may extend from the rear surface 88 of the fiber panel 44 to the outer surface 82, thereby connecting the door portion 160 to the fiber panel 44. Furthermore, in certain embodiments, the fabric support 162 may be coupled to the second resin feature 165 (e.g., via the injection molding process) to retain the second resin feature 165 during airbag deployment.

Figure 15:
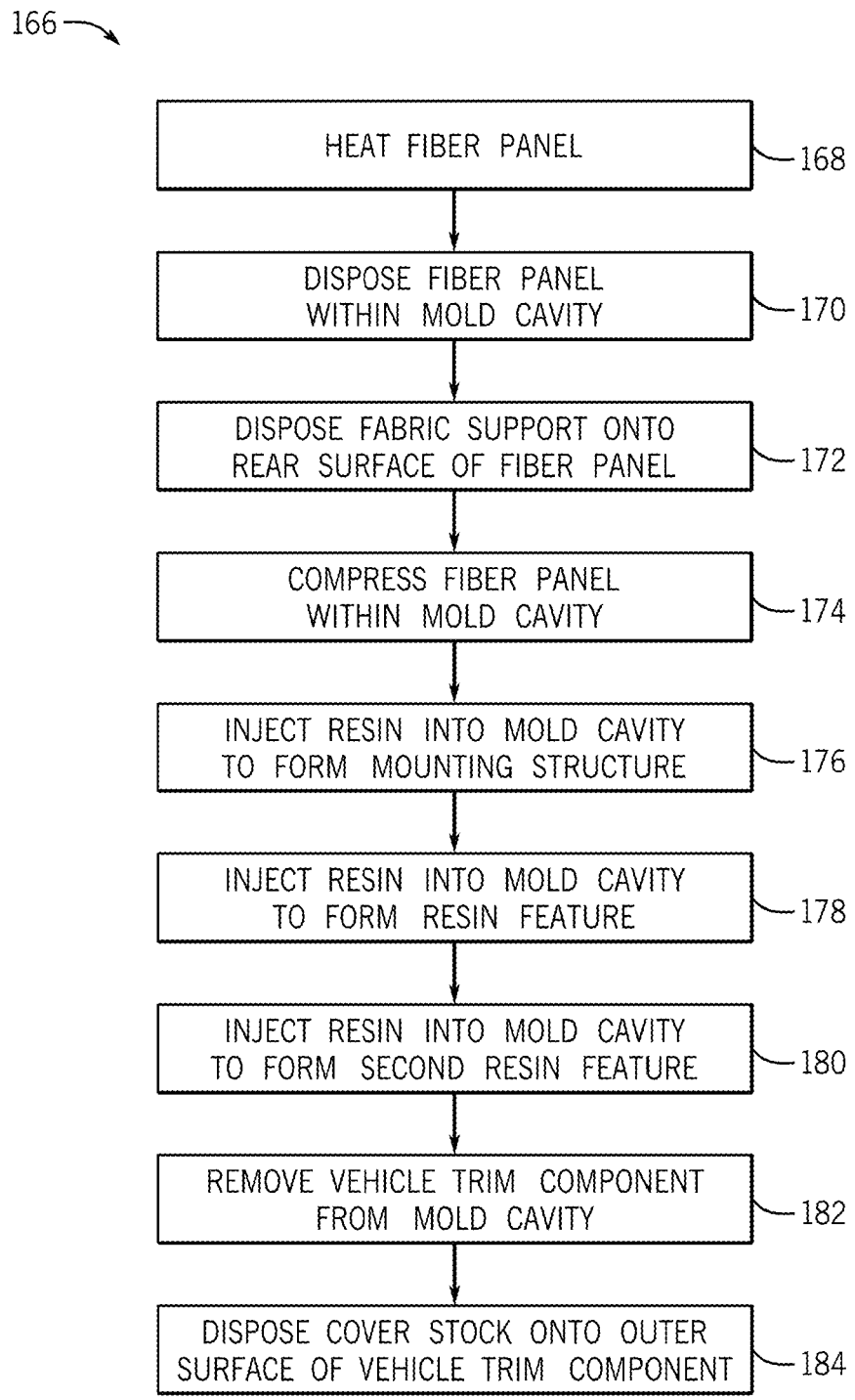
FIG. 15 is a flow diagram of an embodiment of a method of manufacturing a vehicle trim component by injecting resin behind a fiber panel to form a mounting structure for an airbag module.

FIG. 15 is a flow diagram of an embodiment of a method 166 of manufacturing a vehicle trim component by injecting resin behind a fiber panel to form a mounting structure for an airbag module. First, as represented by block 168, a fiber panel is heated. For example, if the fiber panel includes thermoplastic resin, heating the panel softens the resin, thereby facilitating compression forming of the panel. Next, the fiber panel is disposed within a mold cavity, as represented by block 170. In certain embodiments, a fabric support is disposed onto the rear surface of the fiber panel, as represented by block 172. As previously discussed, the fabric support is configured to retain the door portion of the fiber panel during deployment of the airbag.

Next, as represented by block 174, the fiber panel is compressed within the mold cavity to form the fiber panel into a desired shape. In addition, compressing the fiber panel forms a recess within the rear surface of the fiber panel. As previously discussed, the recess is configured to facilitate deployment of the airbag from the airbag module. In certain embodiments, the recess is formed by a protrusion extending from the mold element that faces the rear surface of the fiber panel. For example, as the fiber panel is compressed within the mold cavity, the protrusion engages the rear surface of the fiber panel, thereby forming the recess.

Resin is then injected into the mold cavity to form a mounting structure on the rear surface of the fiber panel, as represented by block 176. As previously discussed, the mounting structure is configured to support the airbag module, thereby obviating a separate airbag chute assembly. In certain embodiments, the mounting structure may include an airbag module support section and a fiber panel support section. The fiber panel support section may include ribs configured to enhance the structural rigidity of the fiber panel. For example, the ribs may extend outwardly from the airbag module support section and/or around the airbag module support section. In embodiments of the vehicle trim component that include a fabric support, resin may be injected into the mold cavity to form a resin feature on the rear surface of the door portion of the fiber panel, as represented by block 178. As previously discussed, the resin feature is configured to secure the fabric support to the door portion. For example, during the injection molding process, resin may flow through the fabric support to the rear surface of the door portion, thereby securing the fabric support to the door portion.

Next, as represented by block 180, resin is injected into the mold cavity to form the second resin feature. As previously discussed, the second resin feature may secure the door portion to the fiber panel prior to deployment of the airbag and/or facilitate separation of the door portion from the fiber panel along the recess. In certain embodiments, a cover stock may be disposed on an outer surface of the trim component to aesthetically enhance a show surface of the component. In such embodiments, the vehicle trim component is removed from the mold cavity, as represented by block 182. A cover stock is then disposed onto the outer surface of the component to form the show surface, as represented by block 184.

In certain embodiments, a single mold cavity may be utilized to compress the fiber panel and to facilitate injection molding of the resin components. However, it should be appreciated that, in alternative embodiments, the fiber panel may be compressed within a first mold cavity, and then transferred to a second mold cavity to facilitate injection molding of the resin components.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle trim component configured to support an airbag module providing an airbag configured to be deployed through an opening comprising:
    a panel providing a front side and a back side; and
    a structure formed from a second material molded on the back side of the panel;
    wherein the panel comprises a compression formed component comprising a first material;
    wherein the panel comprises a door configured to rotate upon deployment of the airbag to facilitate deployment of the airbag;
    wherein the structure is configured to support the airbag module and to direct the airbag toward the door of the panel during deployment of the airbag; and
    wherein the structure comprises a feature formed within the structure configured to establish an opening with the door for the airbag to deploy through the panel created by the airbag at the feature upon deployment of the airbag from the airbag module.

2. The vehicle trim component of claim 1 wherein the panel is formed at least partially from fibers.

3. The vehicle trim component of claim 2 wherein the structure is configured to secure the airbag module to the vehicle trim component and wherein the structure is configured to reinforce the panel.

4. The vehicle trim component of claim 1 wherein the feature comprises a recess formed within the structure configured to facilitate deployment of the airbag.

5. The vehicle trim component of claim 4 wherein the door is configured to open as at least one flap from the structure opened adjacent to the recess configured to open upon deployment of the airbag.

6. The vehicle trim component of claim 5 wherein the door is hinged to the structure and open at the feature.

7. The vehicle trim component of claim 5 further comprising a support coupled to the panel and the structure; wherein the support is configured to secure the door to the panel during deployment of the airbag.

8. The vehicle trim component of claim 6 wherein the door comprises a resin feature configured to secure the support to the door.

9. The vehicle trim component of claim 4 comprising a resin feature injection molded within the recess configured to facilitate deployment of the airbag.

10. The vehicle trim component of claim 1 wherein the structure is injection molded onto the side of the panel.

11. The vehicle trim component of claim 1 wherein the door comprises one flap.

12. The vehicle trim component of claim 1 wherein the door comprises two flaps.

13. A method of manufacturing a vehicle trim component configured to support an airbag module providing an airbag comprising:
    disposing a fiber panel onto a first surface of a mold;
    compressing the fiber panel between the first surface and a second surface of the mold to form the fiber panel into a compression formed component having a shape wherein the shape corresponds to a first contour of the first surface and a second contour of the second surface;
    injecting a resin into the mold after the compression formed component is formed to fill at least one void to form a structure on a side of the fiber panel; and
    removing the vehicle trim component from the mold;

wherein the panel comprises a material formed at least partially from fibers; and wherein the structure is configured to support the airbag module and to direct the airbag toward the fiber panel during deployment of the airbag.

14. The method of claim 13 further comprising compressing a portion of the fiber panel within the mold to form a recess within a surface of the fiber panel configured to facilitate deployment of the airbag.

15. The method of claim 14 further comprising injecting resin into the mold to form a resin feature within the recess configured to facilitate deployment of the airbag.

16. The method of claim 13 further comprising disposing a fabric support on the side of the fiber panel wherein the resin secures the fabric support to at least one of (a) the fiber panel (b) the structure and wherein the fabric support is configured to secure a door to the fiber panel during deployment of the airbag.

17. The method of claim 13 further comprising injecting resin into the mold cavity to form a resin feature on a surface of the door, wherein the resin feature is configured to secure the fabric support to the door.

\* \* \* \* \*